(12) United States Patent
Fang et al.

(10) Patent No.: US 10,486,138 B2
(45) Date of Patent: Nov. 26, 2019

(54) METHOD FOR HYDROTHERMAL SYNTHESIS OF THREE DIMENSIONAL $Bi_4MoO_9/TiO_2$ NANOSTRUCTURE HETEROJUNCTION

(71) Applicant: BEIFANG MINZU UNIVERSITY, Yinchuan (CN)

(72) Inventors: Guo-Li Fang, Yinchuan (CN); Jia Liu, Yinchuan (CN); Xiang-Hui Yan, Yinchuan (CN); De-Wei Wang, Yinchuan (CN)

(73) Assignee: BEIFANG MINZU UNIVERSITY, Yinchuan (CN)

( * ) Notice: Subject to any disclaimer, the term of this patent is extended or adjusted under 35 U.S.C. 154(b) by 0 days.

(21) Appl. No.: 16/385,627

(22) Filed: Apr. 16, 2019

(65) Prior Publication Data

US 2019/0247832 A1  Aug. 15, 2019

Related U.S. Application Data

(63) Continuation-in-part of application No. PCT/CN2017/091715, filed on Jul. 4, 2017.

(30) Foreign Application Priority Data

May 27, 2017  (CN) .......................... 2017 1 0388047

(51) Int. Cl.
*B01J 23/00* (2006.01)
*B01J 35/00* (2006.01)
(Continued)

(52) U.S. Cl.
CPC ............. *B01J 23/002* (2013.01); *B01J 23/31* (2013.01); *B01J 35/004* (2013.01); *B01J 35/023* (2013.01);
(Continued)

(58) Field of Classification Search
CPC ........ B01J 21/063; B01J 23/002; B01J 23/31; B01J 35/00; B01J 35/023; B01J 37/10;
(Continued)

(56) References Cited

U.S. PATENT DOCUMENTS

| 3,415,886 A * | 12/1968 | McClellan | B01J 23/31 |
| | | | 568/473 |
| 8,003,840 B2 * | 8/2011 | Oh | B01J 23/31 |
| | | | 502/305 |
| 2011/0092734 A1 * | 4/2011 | Hagemeyer | B01J 23/002 |
| | | | 562/598 |

FOREIGN PATENT DOCUMENTS

| CN | 10 2500361 | * 6/2012 | .............. B01J 23/31 |
| CN | 10 2600857 | * 7/2012 | ............ B01J 23/847 |

(Continued)

OTHER PUBLICATIONS

Search Report for PCT/CN2017/091715. (Year: 2018).*
(Continued)

*Primary Examiner* — Patricia L. Hailey
(74) *Attorney, Agent, or Firm* — ScienBiziP, P.C.

(57) ABSTRACT

A method for hydrothermal synthesis of 3D $Bi_4MoO_9/TiO_2$ nanostructure heterojunction includes the following step: adding $Bi(NO_3)_3 \cdot 5H_2O$ into distilled water to form a white turbid liquid, and adding an alkaline solution into the white turbid liquid until a potential of hydrogen value of the white turbid liquid is between 3 and 7, thereby obtaining a suspension A; adding $TiO_2$ nanospheres into the suspension A to form a mixed suspension C; adding $Na_2MoO_4 \cdot 2H_2O$ into distilled water to be dissolved to obtaining a $Na_2MoO_4$ solution; adding the $Na_2MoO_4$ solution into the mixed suspension C to form a mixture, and adding an alkaline solution into the mixture until a potential of hydrogen value of the mixture is greater than 7, thereby obtaining a mixed suspension D; transferring the mixed suspension D to a
(Continued)

closed vessel for a hydrothermal reaction to obtain a hydrothermal synthesis product; and washing and drying the hydrothermal synthesis product.

11 Claims, 6 Drawing Sheets

(51) Int. Cl.
    *B01J 23/31*     (2006.01)
    *B01J 37/10*     (2006.01)
    *B01J 35/02*     (2006.01)
    *B82Y 10/00*     (2011.01)

(52) U.S. Cl.
    CPC ............... *B01J 37/10* (2013.01); *B01J 35/00* (2013.01); *B01J 2523/47* (2013.01); *B01J 2523/54* (2013.01); *B01J 2523/68* (2013.01); *B82Y 10/00* (2013.01)

(58) Field of Classification Search
    CPC ............... B01J 2523/47; B01J 2523/54; B01J 2523/68; B82Y 10/00
    USPC ................................. 502/309, 311, 350, 353
    See application file for complete search history.

(56) References Cited

FOREIGN PATENT DOCUMENTS

| CN | 10 5879857 | * | 8/2016 | .............. B01J 23/31 |
| CN | 10 6311220 | * | 1/2017 | .............. B01J 23/31 |

OTHER PUBLICATIONS

Wei Wei, et al., "Transforming MoO3 nanorods into bismuth molybdate nanoplates via the surfactant-assisted hydrothermal method." Ceramics International 41, pp. 11471-11481. (Year: 2015).*

Kirsten Schuh et al., "Selective oxidation of propylene to acrolein by hydrothermally synthesized bismuth molybdates." Applied Catalysis A: General 482, pp. 145-156. (Year: 2014).*

Anukorn Phuruangrat et al., "Hydrothermal Synthesis and Characterization of Bi2MoO6 Nanoplates and Their Photocatalytic Activities." Journal of Nanomaterials, vol. 2013, pp. 1-9. (Year: 2013).*

Yanhua Peng et al., "Enhanced Visible-Light Driven Photocatalytic Activity by 0D/2D phase heterojunction of Quantum Dots/Nanosheets on Bismuth Molybdates." Journal of Physical Chemistry C, 122, pp. 3738-3747. (Year: 2018).*

Toshio Ishikawa et al., "Oxidation of 1-Butene over Multi-Component Oxide System Containing Molybdenum." Bulletin of the Japan Petroleum Institute, vol. 17, No. 1, pp. 76-82. (Year: 1975).*

Wenjie He et al., "Defective Bi4MoO9/Bi metal core/shell heterostructure: Enhanced visible light photocatalysis and reaction mechanism." Applied Catalysis B: Environmental 239, pp. 619-627. (Year: 2018).*

Benjamin Farin, et al., "Bismuth molybdates prepared by solution combustion synthesis for the partial oxidation of propene." Catalysis Today 257, pp. 11-17. (Year: 2015).*

Guoli Fang et al., "Highly Efficient Visible Light Photocatalytic Activities in Self-Assembled Metastable TiO2/Bi4MoO9 Heterojunctions." Advanced Materials Interfaces, 5, 1800844, pp. 1-9. (Year: 2018).*

* cited by examiner

METHOD FOR HYDROTHERMAL SYNTHESIS OF THREE DIMENSIONAL BI$_4$MOO$_9$/TIO$_2$ NANOSTRUCTURE HETEROJUNCTION

CROSS-REFERENCE TO RELATED APPLICATIONS

This application is a continuation-in-part under 35 U.S.C. § 120 of international patent application PCT/CN2017/091715 filed Jul. 4, 2017.

FIELD

The subject matter herein generally relates to composite photocatalyst, specially relates to a method for hydrothermal synthesis of three dimensional (3D) Bi$_4$MoO$_9$/TiO$_2$ nanostructure heterojunction.

BACKGROUND

TiO$_2$ is widely used as a non-toxic, stable and inexpensive photocatalyst. TiO$_2$ has a band gap of 3.2 eV, and the light absorption range of TiO$_2$ is only in the ultraviolet region. A conductivity of photoelectron-hole of TiO$_2$ is low, and a recombination rate of the photoelectron-hole of TiO$_2$ is high. Therefore, the photocatalytic efficiency of TiO$_2$ is severely restricted. In the past ten years, composite photocatalysts with heterojunctions have been formed by a combination of photocatalysts having bank structures which are different from TiO$_2$ and TiO$_2$ to improve the photocatalytic efficiency. Because Fermi levels of the photocatalysts with band structures different from TiO$_2$ and TiO$_2$ are different, a directional movement of the photoelectron-hole occurs at the heterojunctions, which causes the Fermi levels of the photocatalysts with band structures different from TiO$_2$ and TiO$_2$ to gradually become uniform and form an internal electric field at the interface. In the photocatalytic process, a rapid separation of the photoelectron-hole can be promoted under the action of different Fermi levels and the internal electric filed, thereby reducing the recombination rate of the photoelectron-hole and improving the photocatalytic efficiency.

Bi$_x$Mo$_y$O$_z$ can be used as a visible light catalyst. Valence band of the visible light catalyst is formed by a hybridization of the d-orbital of metal element and 2p-orbital of oxygen element, and a relative valence band is mainly a binary oxide composed of the 2p-orbital of oxygen element. Bi$_x$Mo$_y$O$_z$ has a higher valence band positon, the generated hole has a higher potential energy and has a stronger reducing ability, which is beneficial in improving the photocatalytic ability and efficiency. In ACS Catal.6 (2016), 3180-3192, it is stated that increasing the defect concentration of Bi$_x$Mo$_y$O$_z$ can improve the photocatalytic activity of Bi$_x$Mo$_y$O$_z$. For example, under visible light irradiation, the photocatalytic activity of a catalyst with TiO$_2$—Bi$_2$MoO$_6$/Bi$_{3.64}$Mo$_{0.36}$O$_{6.55}$ heterojunctions is higher than the photocatalytic activity of a catalyst with TiO$_2$/Bi$_2$MoO$_6$ heterojunctions.

BRIEF DESCRIPTION OF THE DRAWINGS

Implementations of the present disclosure will now be described, by way of embodiments, with reference to the attached figures.

DETAILED DESCRIPTION

Figure 1:
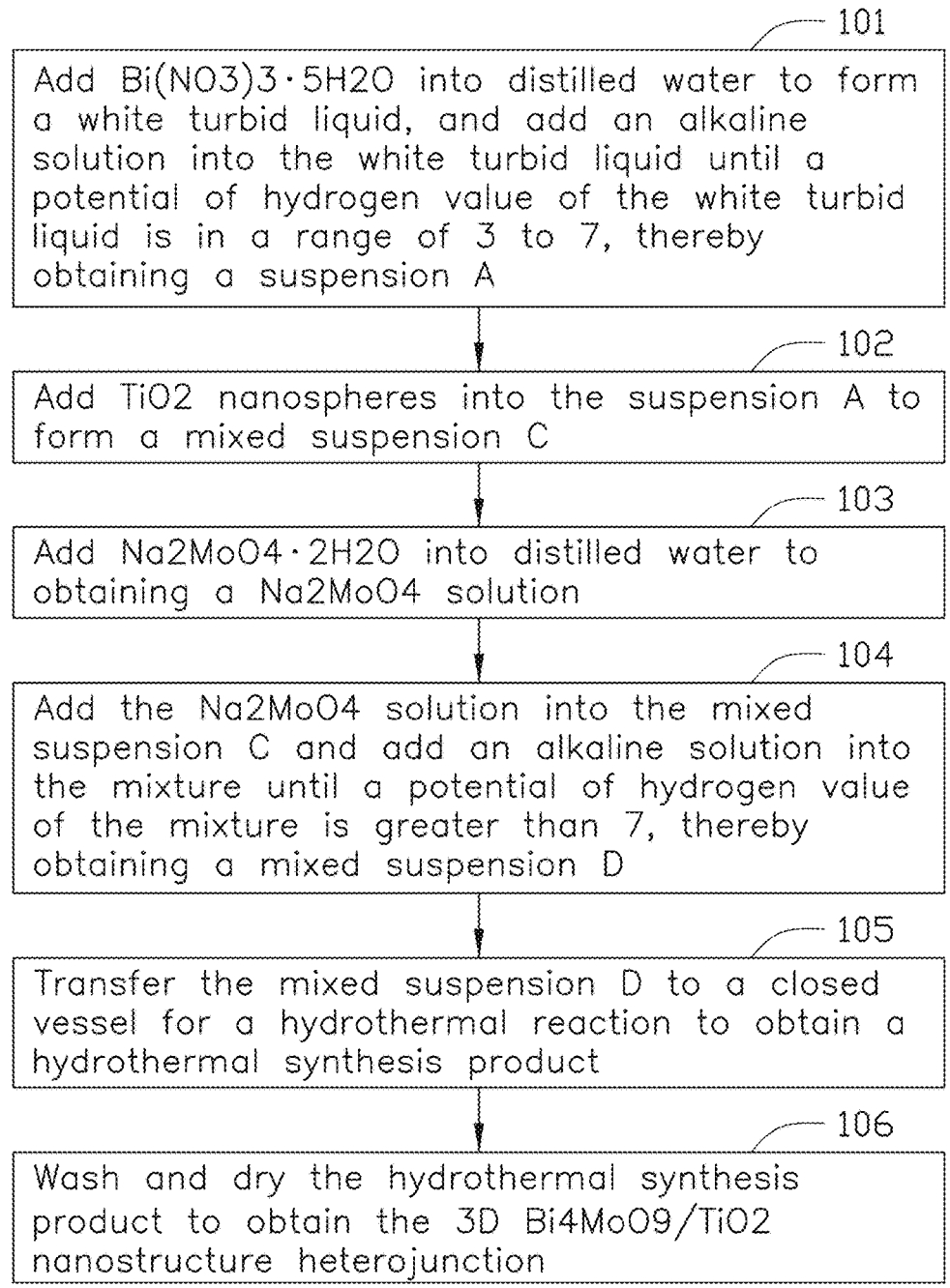
FIG. 1 is a flowchart of an embodiment of a method for hydrothermal synthesis of 3D Bi$_4$MoO$_9$/TiO$_2$ nanostructure heterojunction.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

FIG. 1 illustrates a flowchart of a method for hydrothermal synthesis of 3D Bi$_4$MoO$_9$/TiO$_2$ nanostructure heterojunction in accordance with an embodiment. The method for is provided by way of embodiments, as there are a variety of ways to carry out the method. Each block shown in FIG. 1 represents one or more processes, methods, or subroutines carried out in the method. Furthermore, the illustrated order of blocks is can be changed. Additional blocks may be added or fewer blocks may be utilized, without departing from this disclosure. The method for hydrothermal synthesis of three dimensional 3D Bi$_4$MoO$_9$/TiO$_2$ nanostructure heterojunction can begin at block 101.

At block 101, Bi(NO$_3$)$_3$.5H$_2$O is added into distilled water and stirred to form an uniform white turbid liquid. An alkaline solution is added into the white turbid liquid while being continuously stirred until a potential of hydrogen value of the white turbid liquid is in a range of 3 to 7, thereby obtaining a suspension A.

At block 102, TiO$_2$ nanospheres are added into the suspension A and stirred to form an uniform mixed suspension C. Compounds containing Bi are attached on a surface of TiO$_2$.

In at least one embodiment, a molar ration of Bi(NO$_3$)$_3$·5H$_2$O to the TiO$_2$ nanospheres added into the suspension A may be in a range of 1:5 to 3:5.

At block 103, Na$_2$MoO$_4$·2H$_2$O is added into distilled water and stirred until completely dissolved to obtaining a Na$_2$MoO$_4$ solution.

At block 104, the Na$_2$MoO$_4$ solution is added into the mixed suspension C and stirred to form an uniform mixture. An alkaline solution is added into the mixture while continuously being stirred until a potential of hydrogen value of the mixture is greater than 7, thereby obtaining a mixed suspension D.

In at least one embodiment, a molar ration of Bi(NO$_3$)$_3$·5H$_2$O to Na$_2$MoO$_4$ added to form the mixed suspension D may be in a range of 1:1 to 6:1.

At block 105, the mixed suspension D is transferred to a closed vessel for a hydrothermal reaction to obtain a hydrothermal synthesis product.

In at least one embodiment, a temperature of the hydrothermal reaction is 120 degrees Celsius to 180 degrees Celsius, and a time period of the hydrothermal reaction is 1.5 hours to 8 hours.

At block 106, the synthesis product is washed and dried to obtain a 3D Bi$_4$MoO$_9$/TiO$_2$ nanostructure heterojunction.

In at least one embodiment, a productivity of the 3D Bi$_4$MoO$_9$/TiO$_2$ nanostructure heterojunction is more than 89.4%.

In the above described method, Bi(NO$_3$)$_3$·5H$_2$O and Na$_2$MoO$_4$·2H$_2$O are synthetic raw materials for Bi$_4$MoO$_9$ crystal nanoribbons, and the TiO$_2$ nanospheres are inducers, and synthetic raw materials and the inducers are mixed in liquid phase. The potential of hydrogen values at different stages of the above described method are controlled. Bi$_4$MoO$_9$ crystal nanoribbons are induced to grow in situ on the TiO$_2$ nanospheres to form the 3D Bi$_4$MoO$_9$/TiO$_2$ nanostructure heterojunction. Bi(NO$_3$)$_3$·5H$_2$O is added to obtain the white turbid liquid, then the TiO$_2$ nanospheres are added into the suspension A formed by the white turbid liquid, so that a surface of each of the TiO$_2$ nanospheres is coated with Bi-containing compounds. After adding Na$_2$MoO$_4$ solution into the mixed suspension C, Bi$_4$MoO$_9$ is generated on the surface of each of the TiO$_2$ nanospheres, The 3D Bi$_4$MoO$_9$/TiO$_2$ nanostructure heterojunction is obtained by a hydrothermal reaction of the generated Bi$_4$MoO$_9$ and TiO$_2$, followed by washing and drying.

The 3D Bi$_4$MoO$_9$/TiO$_2$ nanostructure heterojunction manufactured by the above described method is analyzed by X-Ray Diffraction (XRD), High Resolution Transmission Electron Microscopy (HR-TEM) and Energy Disperse Spectroscopy (EDS). No impurity phase is existed in the 3D Bi$_4$MoO$_9$/TiO$_2$ nanostructure heterojunction expect Bi$_4$MoO$_9$ and TiO$_2$. The 3D Bi$_4$MoO$_9$/TiO$_2$ nanostructure heterojunction has excellent photocatalytic performance, and can completely degrade 10 ppm of Rhodamine B under visible light irradiation for 45 minutes.

In the reaction process of the method, H$_2$O is used as solvent, TiO$_2$ nanospheres are used as inducers, and no other organic reagents are used, which reduces the cost of raw materials and the number of times of washing, and avoids discharging of organic pollutants and sewage treatment during the preparation process. The 3D Bi$_4$MoO$_9$/TiO$_2$ nanostructure heterojunction manufactured by the above described method has uniform morphology and excellent photocatalytic performance.

Embodiment 1

0.25 mM of Bi(NO$_3$)$_3$·5H$_2$O was added into 15 mL of distilled water and stirred to form an uniform white turbid liquid. Sodium hydroxide solution was slowly dropwise added into the white turbid liquid while continuously being stirred until a potential of hydrogen value of the white turbid liquid was constant at 5.5, thereby obtaining a suspension A.

1.25 mM of TiO$_2$ nanospheres were added into the suspension A and mixed by stirring or by ultrasonic dispersion to obtain an uniform mixed suspension C.

0.125 mM of Na$_2$MoO$_4$·2H$_2$O was added into 10 mL of distilled water and stirred until completely dissolved to obtaining a Na$_2$MoO$_4$ solution.

The Na$_2$MoO$_4$ solution was slowly dropwise added into the mixed suspension C and stirred uniformly to form a mixture. Sodium hydroxide solution was slowly dropwise added into the mixture while continuously being stirred until a potential of hydrogen value of the mixture was constant at 9, thereby obtaining a mixed suspension D.

The mixed suspension D was transferred to a closed vessel for a hydrothermal reaction at a temperature of 150 degrees Celsius for 5 hours to obtain a hydrothermal synthesis product. The closed vessel was a reaction vessel.

The hydrothermal synthesis product was washed and dried to obtain a 3D Bi$_4$MoO$_9$/TiO$_2$ nanostructure heterojunction. A productivity of the 3D Bi$_4$MoO$_9$/TiO$_2$ nanostructure heterojunction was 98.5%.

Figure 2:
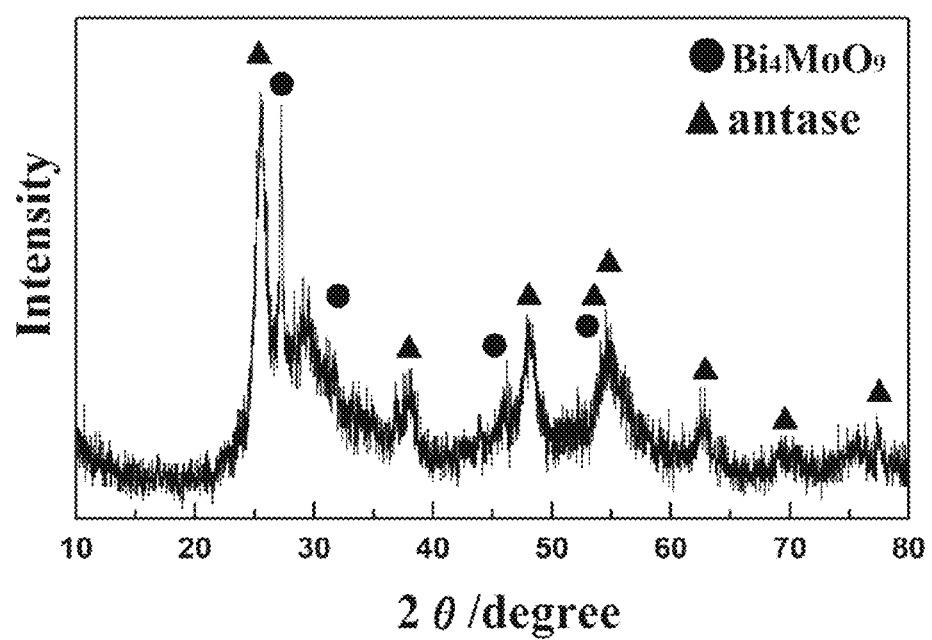
FIG. 2 is an X-Ray diffraction spectrum of the 3D Bi$_4$MoO$_9$/TiO$_2$ nanostructure heterojunction of Embodiment 1.

FIG. 2 indicated that no impurity phase other than Bi$_4$MoO$_9$ and TiO$_2$ in the final product of the method was observed from the diffraction peak of the XRD spectrum.

Figure 3:
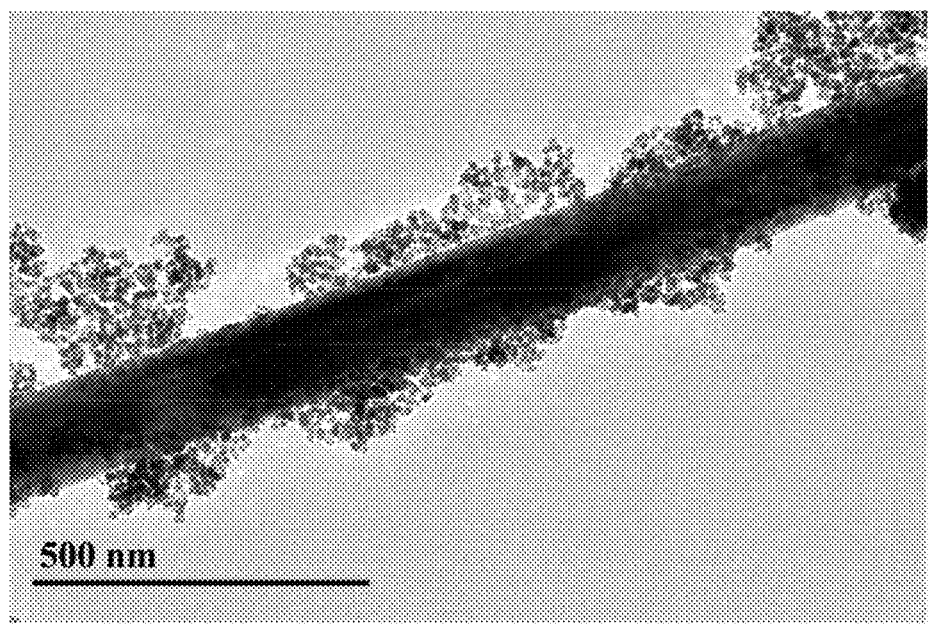
FIG. 3 is a transmission electron microscopy (TEM) image of the 3D Bi$_4$MoO$_9$/TiO$_2$ nanostructure heterojunction of Embodiment 1.
Figure 4:
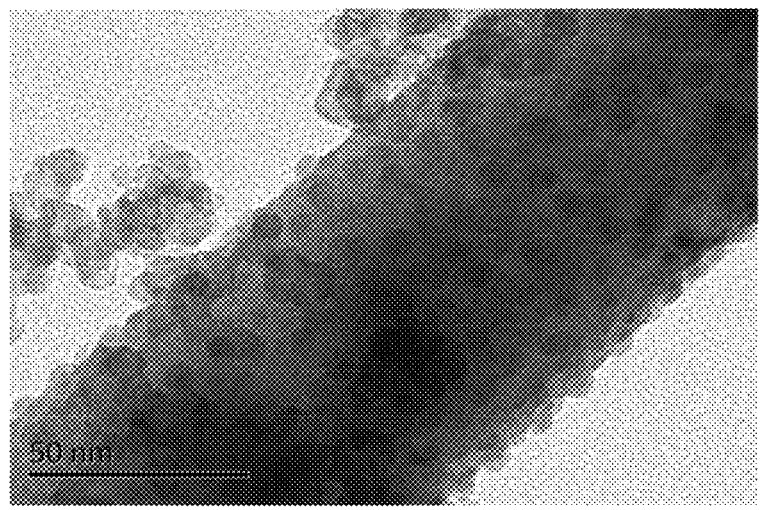
FIG. 4 is a partial enlarged TEM image of FIG. 3.

FIGS. 3 and 4 showed that a large amount of the TiO$_2$ nanospheres were attached to surfaces of Bi$_4$MoO$_9$ crystal nanoribbons.

Figure 5:
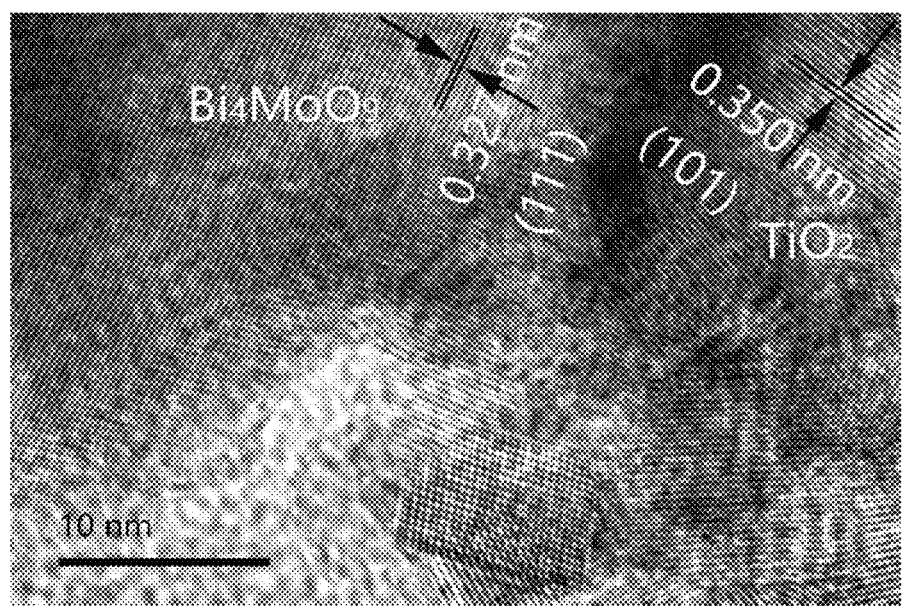
FIG. 5 is a high resolution transmission electron microscopy image of the 3D Bi$_4$MoO$_9$/TiO$_2$ nanostructure heterojunction of Embodiment 1.

Referring to FIG. 5, an interplanar spacing of the Bi$_4$MoO$_9$ crystal nanoribbons d corresponding to the (111) crystal plane of Bi$_4$MoO$_9$ was 0.327 nm. Nano-particles attached to the surface of the nanoribbons were TiO$_2$ nanospheres, and an interplanar spacing corresponding to the (101) crystal plane of TiO$_2$ d was 0.350 nm.

Figure 6:
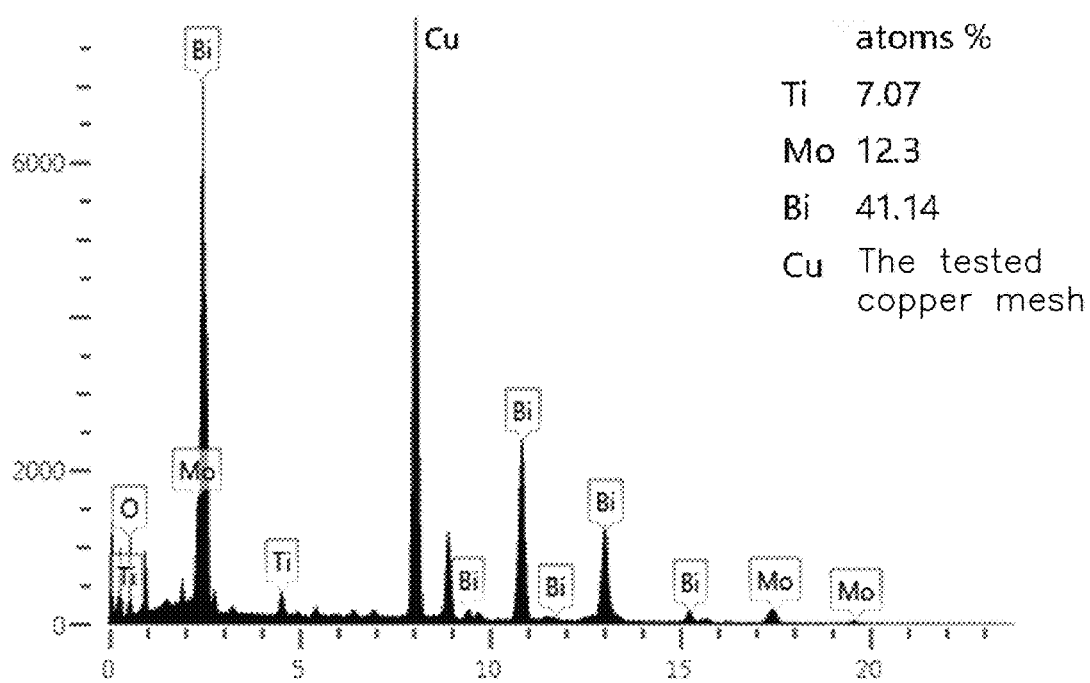
FIG. 6 is an energy disperse spectroscopy spectrum of the 3D Bi$_4$MoO$_9$/TiO$_2$ nanostructure heterojunction of Embodiment 1.

FIG. 6 indicated that an atomic ratio of Bi to Mo was about 4:1, and that the nanoribbons was Bi$_4$MoO$_9$.

Figure 7:
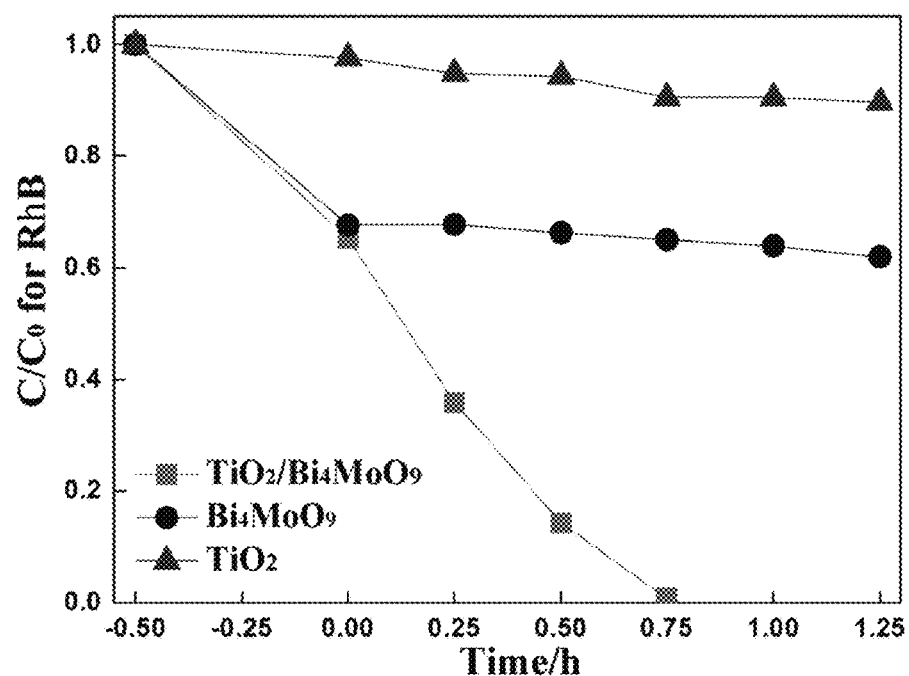
FIG. 7 is a graph illustrating a visible light catalytic activity of the 3D Bi$_4$MoO$_9$/TiO$_2$ nanostructure heterojunction of Embodiment 1, TiO$_2$, and Bi$_4$MoO$_9$ for Rhodamine B, respectively.

Referring to FIG. 7, compared with single TiO$_2$ and single Bi$_4$MoO$_9$, a catalytic degradation rate of Rhodamine B was 100% by the 3D Bi$_4$MoO$_9$/TiO$_2$ nanostructure heterojunction under visible light irradiation for 45 minutes. A catalytic degradation rate of Rhodamine B was still very low by the single TiO$_2$ nano-powders or single Bi$_4$MoO$_9$ nano-powders under visible light irradiation for more than 1 hour.

Figure 8:
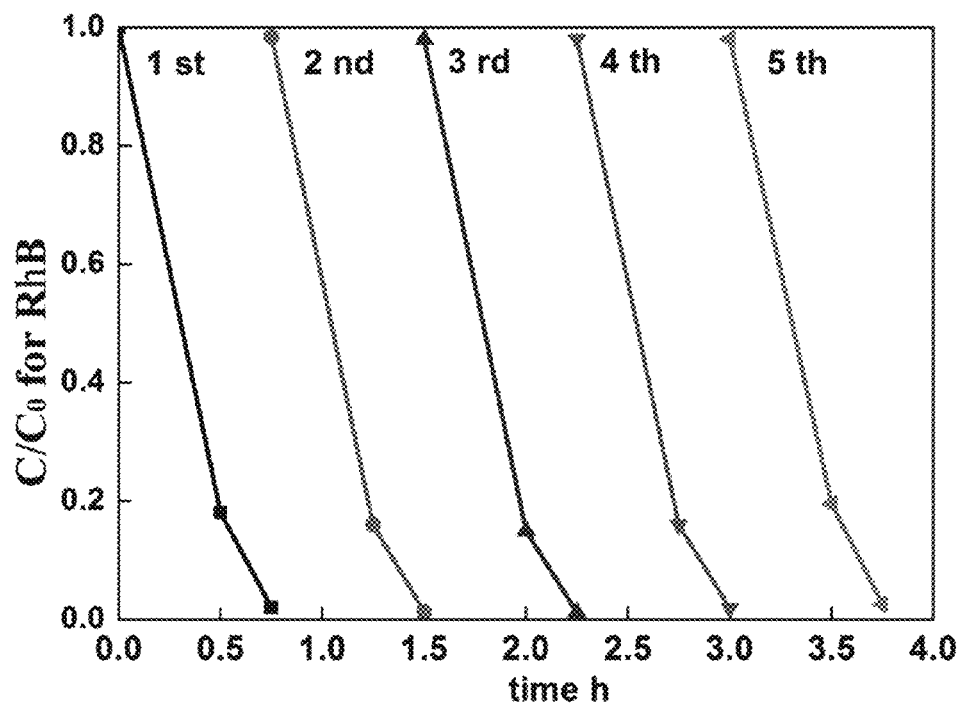
FIG. 8 is a graph illustrating a visible light catalytic cycle stability of the 3D Bi$_4$MoO$_9$/TiO$_2$ nanostructure heterojunction of Embodiment 1 for Rhodamine B.

Referring to FIG. 8, the catalytic degradation rate of Rhodamine B was still 100% by the 3D Bi$_4$MoO$_9$/TiO$_2$ nanostructure heterojunction after 55 cycles, it indicated that the photocatalytic stability of the 3D Bi$_4$MoO$_9$/TiO$_2$ nanostructure heterojunction is very good.

Embodiment 2

0.25 mM of Bi(NO$_3$)$_3$·5H$_2$O was added into 15 mL of distilled water and stirred to form an uniform white turbid liquid. Sodium hydroxide solution was slowly dropwise added into the white turbid liquid while continuously being stirred until a potential of hydrogen value of the white turbid liquid was constant at 3, thereby obtaining a suspension A.

1.25 mM of TiO$_2$ nanospheres were added into the suspension A and mixed uniformly by stirring or by ultrasonic dispersion to obtain a mixed suspension C.

0.25 mM of Na$_2$MoO$_4$·2H$_2$O was added into 10 mL of distilled water and stirred until completely dissolved to obtaining a Na$_2$MoO$_4$ solution.

The Na$_2$MoO$_4$ solution was slowly dropwise added into the mixed suspension C and stirred to form an uniform mixture. Sodium hydroxide solution was slowly dropwise added into the mixture while continuously being stirred until a potential of hydrogen value of the mixture was constant at 8, thereby obtaining a mixed suspension D.

The mixed suspension D was transferred to a closed vessel for a hydrothermal reaction at a temperature of 180 degrees Celsius for 1.5 hours to obtain a hydrothermal synthesis product. The closed vessel was a reaction vessel.

The hydrothermal synthesis product was washed and dried to obtain a 3D $Bi_4MoO_9/TiO_2$ nanostructure heterojunction. A productivity of the 3D $Bi_4MoO_9/TiO_2$ nanostructure heterojunction was 90%.

Embodiment 3

0.25 mM of $Bi(NO_3)_3.5H_2O$ was added into 15 mL of distilled water and stirred to form an uniform white turbid liquid. Sodium hydroxide solution was slowly dropwise added into the white turbid liquid while continuously being stirred until a potential of hydrogen value of the white turbid liquid was constant at 7, thereby obtaining a suspension A.

1.25 mM of $TiO_2$ nanospheres were added into the suspension A and mixed by stirring or by ultrasonic dispersion to obtain an uniform mixed suspension C.

0.125 mM of $Na_2MoO_4.2H_2O$ was added into 10 mL of distilled water and stirred until completely dissolved to obtaining a $Na_2MoO_4$ solution.

The $Na_2MoO_4$ solution was slowly dropwise added into the mixed suspension C and stirred to form an uniform mixture. Sodium hydroxide solution was slowly dropwise added into the mixture while continuously being stirred until a potential of hydrogen value of the mixture was constant at 10, thereby obtaining a mixed suspension D.

The mixed suspension D was transferred to a closed vessel for a hydrothermal reaction at a temperature of 150 degrees Celsius for 5 hours to obtain a hydrothermal synthesis product. The closed vessel was a reaction vessel.

The hydrothermal synthesis product was washed and dried to obtain a 3D $Bi_4MoO_9/TiO_2$ nanostructure heterojunction. A productivity of the 3D $Bi_4MoO_9/TiO_2$ nanostructure heterojunction was 89.4%.

Embodiment 4

0.75 mM of $Bi(NO_3)_3.5H_2O$ was added into 15 mL of distilled water and stirred to form an uniform white turbid liquid. Sodium hydroxide solution was slowly dropwise added into the white turbid liquid while being continuously stirred until a potential of hydrogen value of the white turbid liquid was constant at 5.5, thereby obtaining a suspension A.

1.25 mM of $TiO_2$ nanospheres were added into the suspension A and mixed by stirring or by ultrasonic dispersion to obtain an uniform mixed suspension C.

0.125 mM of $Na_2moO_4.2H_2O$ was added into 10 mL of distilled water and stirred until completely dissolved to obtaining a $Na_2MoO_4$ solution.

The $Na_2MoO_4$ solution was slowly dropwise added into the mixed suspension C and stirred to form an uniform mixture. Sodium hydroxide solution was slowly dropwise added into the mixture while being continuously stirred until a potential of hydrogen value of the mixture was constant at 9, thereby obtaining a mixed suspension D.

The mixed suspension D was transferred to a closed vessel for a hydrothermal reaction at a temperature of 150 degrees Celsius for 5 hours to obtain a hydrothermal synthesis product. The closed vessel was a reaction vessel.

The hydrothermal synthesis product was washed and dried to obtain a 3D $Bi_4MoO_9/TiO_2$ nanostructure heterojunction. A productivity of the 3D $Bi_4MoO_9/TiO_2$ nanostructure heterojunction was 93.5%.

Embodiment 5

0.25 mM of $Bi(NO_3)_3.5H_2O$ was added into 15 mL of distilled water and stirred to form an uniform white turbid liquid. Sodium hydroxide solution was slowly dropwise added into the white turbid liquid while being continuously stirred until a potential of hydrogen value of the white turbid liquid was constant at 5.5, thereby obtaining a suspension A.

1.25 mM of $TiO_2$ nanospheres were added into the suspension A and mixed by stirring or by ultrasonic dispersion to obtain an uniform mixed suspension C.

0.125 mM of $Na_2MoO_4.2H_2O$ was added into 10 mL of distilled water and stirred until completely dissolved to obtaining a $Na_2MoO_4$ solution.

The $Na_2MoO_4$ solution was slowly dropwise added into the mixed suspension C and stirred to form an uniform mixture. Sodium hydroxide solution was slowly dropwise added into the mixture while being continuously stirred until a potential of hydrogen value of the mixture was constant at 9, thereby obtaining a mixed suspension D.

The mixed suspension D was transferred to a closed vessel for a hydrothermal reaction at a temperature of 120 degrees Celsius for 8 hours to obtain a hydrothermal synthesis product. The closed vessel was a reaction vessel.

The hydrothermal synthesis product was washed and dried to obtain a 3D $Bi_4MoO_9/TiO_2$ nanostructure heterojunction. A productivity of the 3D $Bi_4MoO_9/TiO_2$ nanostructure heterojunction was 90%.

Embodiment 6

0.5 mM of $Bi(NO_3)_3.5H_2O$ was added into 15 mL of distilled water and stirred to form an uniform white turbid liquid. Sodium hydroxide solution was slowly dropwise added into the white turbid liquid while being continuously stirred until a potential of hydrogen value of the white turbid liquid was constant at 5.5, thereby obtaining a suspension A.

1.5 mM of $TiO_2$ nanospheres were added into the suspension A and mixed by stirring or by ultrasonic dispersion to obtain an uniform mixed suspension C.

0.125 mM of $Na_2MoO_4.2H_2O$ was added into 10 mL of distilled water and stirred until completely dissolved to obtaining a $Na_2MoO_4$ solution.

The $Na_2MoO_4$ solution was slowly dropwise added into the mixed suspension C and stirred to form an uniform mixture. Sodium hydroxide solution was slowly dropwise added into the mixture while being continuously stirred until a potential of hydrogen value of the mixture was constant at 9, thereby obtaining a mixed suspension D.

The mixed suspension D was transferred to a closed vessel for a hydrothermal reaction at a temperature of 170 degrees Celsius for 1.5 hours to obtain a hydrothermal synthesis product. The closed vessel was a reaction vessel.

The hydrothermal synthesis product was washed and dried to obtain a 3D $Bi_4MoO_9/TiO_2$ nanostructure heterojunction. A productivity of the 3D $Bi_4MoO_9/TiO_2$ nanostructure heterojunction was 91.4%.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A method for hydrothermal synthesis of 3D $Bi_4MoO_9$/$TiO_2$ nanostructure heterojunction comprising:
    adding $Bi(NO_3)_3 \cdot 5H_2O$ into distilled water and stirring to form a white turbid liquid, and adding an alkaline solution into the white turbid liquid while being continuously stirred until a potential of hydrogen value of the white turbid liquid is in a range of 3 to 7, thereby obtaining a suspension A;
    adding $TiO_2$ nanospheres into the suspension A and stirring to form a mixed suspension C;
    adding $Na_2MoO_4 \cdot 2H_2O$ into distilled water and stirring until $Na_2MoO_4 \cdot 2H_2O$ is completely dissolved to obtaining a $Na_2MoO_4$ solution;
    adding the $Na_2MoO_4$ solution into the mixed suspension C and stirring to form a mixture, and adding an alkaline solution into the mixture while being continuously stirred until a potential of hydrogen value of the mixture is greater than 7, thereby obtaining a mixed suspension D;
    transferring the mixed suspension D to a closed vessel for a hydrothermal reaction to obtain a hydrothermal synthesis product; and
    washing and drying the hydrothermal synthesis product to obtain the 3D $Bi_4MoO_9$/$TiO_2$ nanostructure heterojunction.

2. The method for hydrothermal synthesis of 3D $Bi_4MoO_9$/$TiO_2$ nanostructure heterojunction of claim 1, wherein a molar ratio of the $Bi(NO_3)_3 \cdot 5H_2O$ to the $TiO_2$ nanospheres in the suspension A is in a range of 1:5 to 3:5.

3. The method for hydrothermal synthesis of 3D $Bi_4MoO_9$/$TiO_2$ nanostructure heterojunction of claim 2, wherein a molar ration of the $Bi(NO_3)_3 \cdot 5H_2O$ to the $Na_2MoO_4$ added to form the mixed suspension D is in a range of 1:1 to 6:1.

4. The method for hydrothermal synthesis of 3D $Bi_4MoO_9$/$TiO_2$ nanostructure heterojunction of claim 3, wherein a temperature of the hydrothermal reaction is in a range of 120 degrees Celsius to 180 degrees Celsius, and a time period of the hydrothermal reaction is in a range of 1.5 hours to 8 hours.

5. The method for hydrothermal synthesis of 3D $Bi_4MoO_9$/$TiO_2$ nanostructure heterojunction of claim 4, wherein the alkaline solution added into the white turbid liquid is sodium hydroxide solution.

6. The method for hydrothermal synthesis of 3D $Bi_4MoO_9$/$TiO_2$ nanostructure heterojunction of claim 5, wherein the alkaline solution added into the mixture is sodium hydroxide solution.

7. The method for hydrothermal synthesis of 3D $Bi_4MoO_9$/$TiO_2$ nanostructure heterojunction of claim 6, wherein a productivity of the 3D $Bi_4MoO_9$/$TiO_2$ nanostructure heterojunction is more than 89.4%.

8. The method for hydrothermal synthesis of 3D $Bi_4MoO_9$/$TiO_2$ nanostructure heterojunction of claim 1, wherein the 3D $Bi_4MoO_9$/$TiO_2$ nanostructure heterojunction completely degrade 10 ppm of Rhodamine B under visible light irradiation for 45 minutes.

9. The method for hydrothermal synthesis of 3D $Bi_4MoO_9$/$TiO_2$ nanostructure heterojunction of claim 1, wherein the 3D $Bi_4MoO_9$/$TiO_2$ nanostructure heterojunction consists of $Bi_4MoO_9$ and $TiO_2$.

10. The method for hydrothermal synthesis of 3D $Bi_4MoO_9$/$TiO_2$ nanostructure heterojunction of claim 1, wherein surfaces of each of the $TiO_2$ nanospheres in the mixed suspension C are coated with Bi-containing compounds.

11. The method for hydrothermal synthesis of 3D $Bi_4MoO_9$/$TiO_2$ nanostructure heterojunction of claim 10, further comprising coating the surfaces of each of the $TiO_2$ nanospheres with $Bi_4MoO_9$ after adding $Na_2MoO_4$ solution into the mixed suspension C.

* * * * *